UNITED STATES PATENT OFFICE.

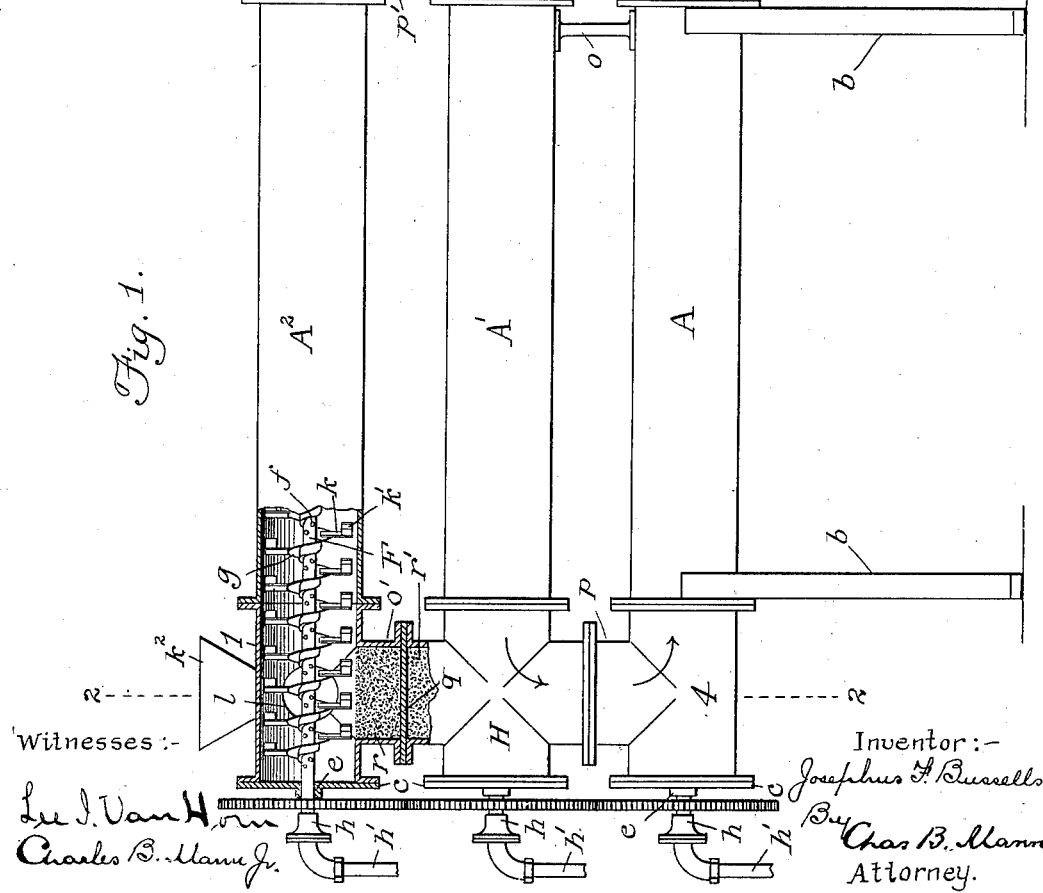

JOSEPHUS F. BUSSELLS, OF IRVINGTON, VIRGINIA, ASSIGNOR TO THE AMERICAN PROCESS COMPANY, OF NEW YORK, N. Y.

APPARATUS FOR MAKING FERTILIZERS.

SPECIFICATION forming part of Letters Patent No. 656,595, dated August 21, 1900.

Application filed October 5, 1898. Serial No. 692,668. (No model.)

*To all whom it may concern:*

Be it known that I, JOSEPHUS F. BUSSELLS, a citizen of the United States, residing at Irvington, in the county of Lancaster and State of Virginia, have invented certain new and useful Improvements in Apparatus for Converting Matter into Fertilizers, of which the following is a specification.

This invention relates to an apparatus for treating matter with chemicals in order to prepare the same as an ingredient for use in the manufacture of commercial fertilizers.

The process consists in applying suitable chemicals, including an acid, to any animal or vegetable acidified matter, then passing the said matter into one end of a closed vessel, stirring and agitating the said matter in the vessel as it passes from one end to the other, and subjecting the matter while being stirred to the action of heated fluid and without exposing the matter to the atmosphere.

In order to practically work this improved continuous process, I have provided an apparatus, shown in the accompanying drawings, in which—

Figure 1 is an elevation of the apparatus and shows certain parts in section. Fig. 2 is a vertical cross-section on the line 2 2.

The object of both the method and the apparatus hereinafter described is to treat on a large scale any vegetable or animal matter, such as cooked fish and garbage, with chemicals, including acid, as a step in the manufacture of commercial fertilizers.

The apparatus will now be described.

A plural number of horizontal cylinders A A' A²—say three in number or more or less—are mounted one above the other and supported on a suitable stand or legs $b$. Each of the said cylinders is provided with the same internal mechanism. It will therefore be sufficient to describe the mechanism of only one. Each cylinder or tube has at its ends a T-joint, closed by heads $c$ $d$, and a tubular shaft F extends lengthwise through the cylinder and projects through the heads to the outside, the shaft being revoluble in suitable stuffing-boxes at $e$. A spiral flange $g$ surrounds the tubular shaft in the cylinder and extends from one end to the other. Agitator-arms are attached to the spiral flange $g$. The arms are shown in Fig. 1 and comprise a shank $k$, at the end of which is an angle-blade $k'$, one side of the angle-blade being secured to the shank and the other projecting and serving as a paddle or stirrer. Within the cylinder the hollow shaft has small holes $f$ for heated fluid, such as steam or hot air, to pass from the shaft to the cylinder. At one end each hollow shaft is fitted to a stuffing-box $h$, with which a steam or hot-air pipe $h'$ connects. The second cylinder A' is supported near one end and above the lowermost cylinder by a suitable post $o$, and at the other end is supported by a vertical tubular neck $p$, connecting and forming a passage between the two cylinders A A'. This neck and passage $p$ is formed by one branch of the T-joint 4 on the lower cylinder, connecting with one branch of the cross-joint H on the second cylinder. In like manner a vertical tubular neck and passage-way $p'$ supports the third or topmost cylinder A² at one end. This neck and passage $p'$ is formed by the connection of one branch from each of the two T-joints 2 3. The topmost cylinder at its other end is supported by the neck $o'$, which, however, has no passage through it, although exteriorly it has the same appearance as the tubular necks. The vertical passage in neck $o'$ is interrupted by a plate $q$, interposed between the T-joint 1 on the topmost cylinder and one branch of the cross-joint H on the second cylinder. The interposed plate $q$ results in forming a bottom recess at $r$ in the T-joint 1 and a top recess $r'$ in the upper branch of the cross-joint H. These recesses if left open would be objectionable, and the objection is overcome by closing and filling them with suitable hard cement, such as Portland cement.

The lowermost cylinder A has at one end a depending tapered discharge-neck $s$. A vertical shaft $t$ passes through the lower cylinder. Its upper end is abutted against a bearing $n$ on the exterior of the second cylinder, and its lower end is provided with a tapered compressing-screw $t'$, which fills or fits within the tapered discharge-neck. This vertical shaft has a miter-wheel $v$. It will be understood that as the finished product is about to be discharged it advances into the small diameter of the discharge-neck, where it is compacted or compressed, and thereby it prevents the escape of the steam or hot air from the lower cylinder.

A feeding-in device of improved construction is provided and attached to the topmost cylinder, and consists of a horizontally-placed tapered tube L, whose small end connects with an opening $l$ in the side of the cylinder-wall. The large end of the tapered feed-tube is closed by a head $l'$, and near this end the tube has on top a funnel-mouth or hopper $k^2$, and a shaft $m$ extends horizontally within the feed-tube and projects through the head $l'$ and on the outside has a pulley $m'$ to be driven by a belt or chain. A tapered compressing-screw $n$ is on the shaft $m$. This construction of horizontal tapered tube, with its large end closed and its small end connecting with the cylinder on the side, insures that a supply of the matter may be continuously fed into the cylinder under conditions that will keep the feed-tube so choked or jammed full of matter as to prevent escape of steam-pressure or hot air from the cylinder and enable considerable pressure to be maintained within the cylinder. This construction and arrangement for horizontally feeding will operate satisfactorily whether the mass of matter that is being fed be in either a dry or a very wet condition.

The tubular shaft in the lowermost cylinder is driven by a pulley $i$. This shaft has a gear-wheel $w$, which engages a wheel $w'$ on the shaft of the second cylinder, and said wheel $w'$ engages a wheel $w^2$ on the shaft in the topmost cylinder. The same arrangement of gear-wheels is at both ends.

The vertical shaft $t$ has a miter-pinion $v$, as already stated, and is driven by a miter-wheel $v'$ on a short shaft, carrying a gear-wheel $y$, which in turn is driven by a gear-rim $y'$ on the wheel $w'$ of the shaft end projecting from the second cylinder.

By this construction the matter to be treated is entered into the funnel or hopper $k^2$ and fed into the upper vessel $A^2$, which is kept tight by the action of the feed device. Here the said matter is stirred and agitated without exposure to the atmosphere. While the stirring is going on, hot fluid, such as steam or hot air, is entered into the vessel and the temperature is raised and pressure is created. Thereby the heated chemicals, including acid, attack the matter, whereby the phosphoric acid in the matter becomes soluble. The treated mass then passes to the next vessel $A'$, also kept tight, where the stirring and agitating are continued under the same pressure, though in this vessel the temperature may be modified from what exists in either of the other vessels, and said treated mass then passes to the lowermost tight vessel A and is further stirred and agitated and finally discharged at $s$. The product is then ready to go to a drier.

It will be seen that in the operation of this apparatus the several vessels or cylinders will contain matter in all stages of treatment, some having just been entered, and therefore not yet treated at all, some which has been partly treated, and some which has been fully treated and just ready to be discharged.

Having thus described my invention, what I claim is—

1. An apparatus for processing vegetable or animal matter comprising a plural number of cylinders, one above the other and communicating with each other so as to form a continuous passage-way through the several cylinders; a revoluble agitator within each cylinder; a horizontal tapered feed-neck having its small end entering the topmost cylinder; a tapered compressing-screw in said horizontal feed-neck; and a hopper or funnel attached to the large end of said horizontal neck.

2. An apparatus for processing matter for fertilizers comprising in combination a plural number of horizontal cylinders one above the other; a tubular joint communicating from the side of an upper cylinder at one end to the side of the cylinder next below; a depending tapered discharge-neck at one end of the lowermost cylinder; a vertical shaft which passes diametrically through the lowermost cylinder and extends down the said discharge-neck and has a compressing-screw in said neck; a revoluble shaft in each cylinder and the projecting ends of the shafts connected by gears; and a short shaft gearing with said gears and also gearing with and driving the vertical shaft in the discharge-neck.

In testimony whereof I affix my signature in the presence of two witnesses.

JOSEPHUS F. BUSSELLS.

Witnesses:
CHAPIN A. FERGUSON,
CHARLES B. MANN, Jr.